United States Patent [19]

Storrick

[11] Patent Number: 4,707,324
[45] Date of Patent: Nov. 17, 1987

[54] CONTROLLING THE RESPONSE OF A PRESSURIZED WATER REACTOR TO RAPID FLUCTUATIONS IN LOAD

[75] Inventor: Gary D. Storrick, Peters Township, Washington County, Pa.

[73] Assignee: Westinghouse Electric Corp., Pittsburgh, Pa.

[21] Appl. No.: 686,768

[22] Filed: Dec. 27, 1984

[51] Int. Cl.$^4$ .................................................. G21C 7/00
[52] U.S. Cl. ..................................... 376/215; 376/236; 376/241; 376/242
[58] Field of Search ................ 364/527; 376/215–218, 376/210, 241, 244, 242, 236

[56] References Cited

U.S. PATENT DOCUMENTS

| | | | |
|---|---|---|---|
| 3,933,580 | 1/1976 | Aleite et al. | |
| 3,997,767 | 12/1976 | Torres et al. | |
| 3,998,693 | 12/1976 | Musick | 376/217 |
| 4,016,034 | 4/1977 | Musick | 376/216 |
| 4,046,625 | 9/1977 | Musick et al. | |
| 4,055,463 | 10/1977 | Torres | |
| 4,187,144 | 2/1980 | Mueller et al. | 376/216 |
| 4,222,822 | 9/1980 | Mueller et al. | |
| 4,299,657 | 11/1981 | Abenhaim et al. | 376/217 |
| 4,326,917 | 4/1982 | Kelly, Jr. et al. | 376/216 |
| 4,399,095 | 8/1983 | Morris | 376/216 |
| 4,432,930 | 2/1984 | Impink, Jr. | 376/244 |

FOREIGN PATENT DOCUMENTS

| | | |
|---|---|---|
| 0026563 | 7/1980 | European Pat. Off. |
| 2392472 | 12/1978 | France |
| 1206728 | 9/1970 | United Kingdom ................ 376/244 |

Primary Examiner—Deborah L. Kyle
Assistant Examiner—Daniel Wasil
Attorney, Agent, or Firm—Daniel C. Abeles

[57] ABSTRACT

The setpoints for control systems in a pressurized water reactor are adjusted by an amount corresponding to the expected change in the controlled process variable resulting from rapid fluctuations in load to reduce the duty time of the control system components such as the rod drive mechanisms in the rod control system and the spray and heater units in the pressurizer pressure control system. In addition, the deadband in the response of the rod control system is continuously varied as a function of the variance of the magnitude of the rapid fluctuations in load to further reduce wear while maintaining good response during load following.

31 Claims, 3 Drawing Figures

CONTROLLING THE RESPONSE OF A PRESSURIZED WATER REACTOR TO RAPID FLUCTUATIONS IN LOAD

BACKGROUND OF THE INVENTION

This invention relates to a method and apparatus for controlling the response of a pressurized water reactor in a nuclear power plant to rapid fluctuations in load. More particularly, it is directed to such a method and apparatus in which a control system setpoint is varied in response to small rapid changes in plant turbine load in such a manner that the setpoint variations match the expected variations in the controlled parameter. It is also directed to such a method and apparatus in which the width of the deadband in the response of the rod control system to changes in a load signal is varied as a function of the magnitude of rapid fluctuations in the magnitude of the load signal.

PRIOR ART

Nuclear power plants have typically been operated at constant high power levels due to their low fuel costs and high capital investment. When the total nuclear generating capacity exceeds the utilities minimum load demand, however, it is necessary for some or all of these nuclear units to operate in a "load follow" mode. In other words, they must adjust their power level so that total generation balances total demand. In general, the utility desires to determine which plants will load follow based on the economic consideration of minimizing total generation cost. This function is often performed by an Economic Dispatch Computer which optimizes the distribution of power generation among the various units supplying the grid. Signals are then sent to each plant instructing the control system in each as to how much power the plant should produce. This signal typically consists of a slowly changing component representing normal daily grid load variations plus small, rapid changes representing load changes induced by individual users. Alternately, small rapid changes in plant load may be induced by systems (either remote or local) which act to maintain grid frequency at its reference value as grid load changes. The slow component is accommodated by normal control systems. The fast component can be accommodated by the normal control systems, but the result is excessive wear on the control rod drive mechanisms coupled with increased operating difficulty due to core power distribution fluctuations resulting in reduced availability. This may be due to difficulty in complying with power distribution technical specifications and/or reduced margin to trip resulting in increased probability of a reactor trip. The fast component of load can also cause excessive operation of other systems such as the spray system and heaters used to control pressurizer pressure, the pressurizer water level control and the boron system.

A recent design of an Integrated Control System by the assignee of this invention, provided for manual widening of the rod control system deadband which would minimize rod motion by allowing larger temperature variations to occur in the nuclear steam supply system. This avoided the rod wear problem because reactivity changes associated with the power changes were accomplished via feedback of the moderator temperature coefficient. It also avoided the power distribution changes associated with control rod motion. Unfortunately such control was only possible below approximately 85% power since at high power levels the wider deadband would allow the reactor coolant system temperature to exceed the full power (license) value.

SUMMARY OF THE INVENTION

In the present invention, the setpoint for a control system in a pressurized water reactor is adjusted by an amount corresponding to the expected variation in the value of the controlled parameter resulting from rapid fluctuations in the load imposed on the reactor. In this manner, the control system accommodates to the load change by allowing the value of the parameter to vary with the small rapid load changes rather than taking numerous control actions to maintain the parameter at the programmed setpoint value. This is accomplished by extracting the high frequency component of the load signal and applying to it a transfer function representative of the relationship between the value of the setpoint and the corresponding value of the parameter taking into account system response times to generate an adjustment signal which is added to the setpoint signal. The adjustment signal is limited in magnitude so that the control system responds to large changes in load with normal control action, and if required, the correction is applied to the setpoint signal only if the parameter is below a preset value in order to prevent excursions which might result in a reactor trip.

Also in the present invention, the deadband in the rod control system of a pressurized water reactor automatically widens in order to accommodate for the small rapid load fluctuations described above. The amount of widening is a function of the magnitude of the fluctuations of the load signal occurring above a predetermined frequency. In the preferred embodiment of the invention, the width of the deadband is varied as a function of the average squared value (variance) of the magnitude of these flucuations.

In a pressurized water reactor, the temperature is usually controlled as a function of power level. Accordingly, the load signal is converted to a temperature reference signal which is used in a feedback control loop to position the control rods to drive the measured reactor temperature toward the value commanded by the temperature reference signal. As another feature of this invention, the temperature reference signal for the rod control system is modified, if required (normally at high power levels only), so that the high-temperature edge of the rod control system deadband does not exceed a maximum value which provides adequate margin to reactor trip and in addition, does not violate the license maximum temperature limit.

DESCRIPTION OF THE PREFERRED EMBODIMENT

Figure 1:
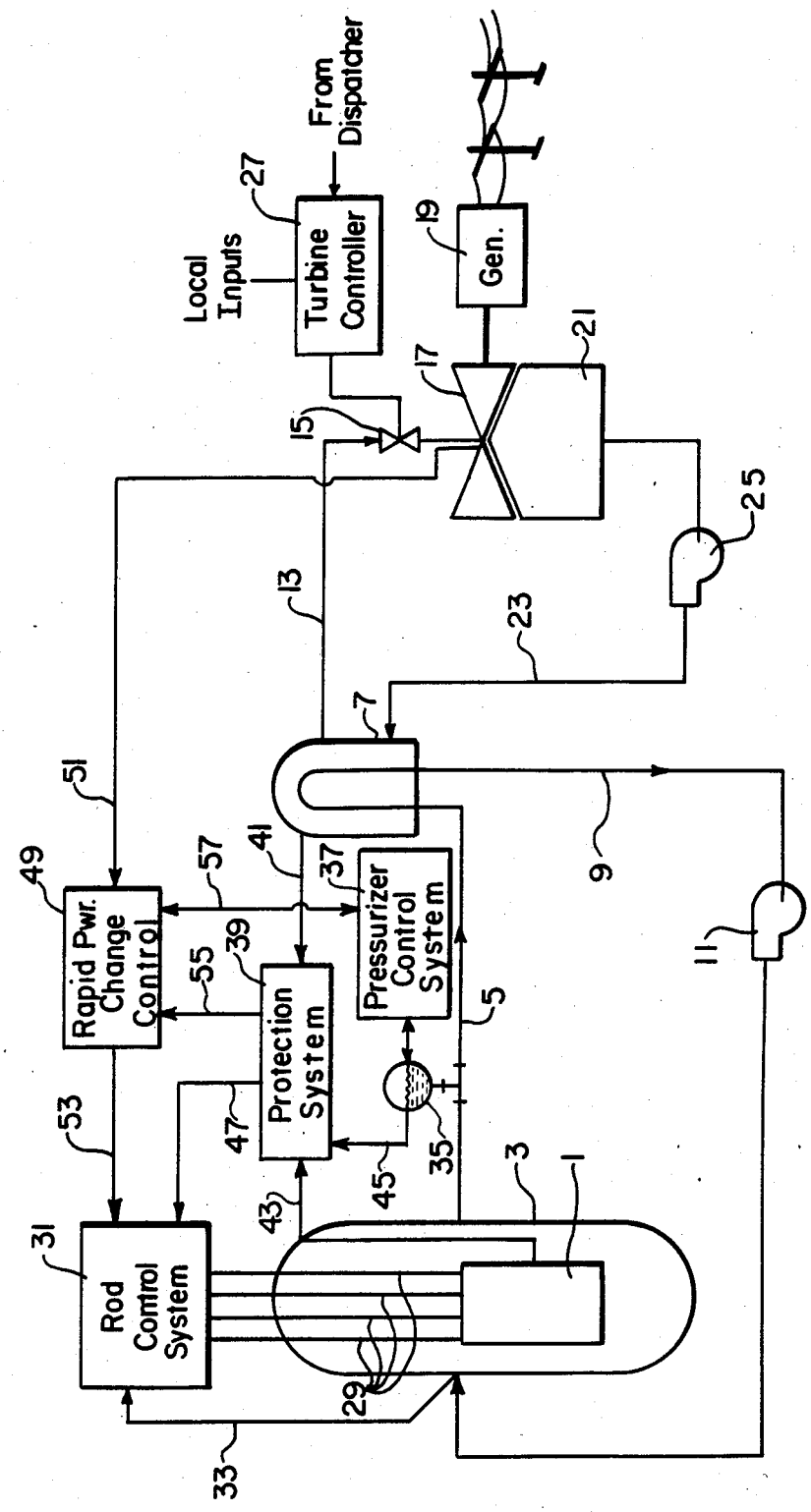
FIG. 1 is a schematic diagram of a pressurized water reactor (PWR) electric power generating system incorporating the invention.

The pressurized water reactor, PWR, electric power generating system disclosed in FIG. 1 includes a reactor core 1 contained in a reactor vessel 3. A reactor coolant in the form of ordinary water circulates through the reactor core 1 where it absorbs heat generated by controlled fission reactions. The heated reactor coolant is pumped through a hot leg 5 to a steam generator 7 and then back to the reactor core through cold leg 9 by a recirculating pump 11. The steam generator 7 utilizes the thermal energy in the reactor coolant to generate steam which is supplied through a steam header 13 and throttle valve 15 to a turbine 17 which in turn, drives an electric generator 19. Vitiated steam from the turbine is condensed in condenser 21 and the condensate is returned to the steam generator 7 through conduit 23 by pump 25 for regeneration. A typical PWR plant may have two to four steam generators 7 supplying steam to the turbine through separate loops.

The throttle valve 15 on the turbine 17 is positioned by a turbine controller 27 in response to a dispatch signal received from a central load dispatcher which allocates load to individual plants in a power grid, and/or from local commands such as operator generated load commands or limits. The temperature of the reactor coolant is controlled by control rods 29 which are inserted into and withdrawn from the reactor core 1 by a rod control system 31. The control rods 29 contain neutron absorbing material which affects the density of thermal neutrons in the core available for sustained fission reactions. The rod control system positions the control rods to maintain a setpoint reactor temperature. The actual reactor coolant temperature is fed back to the rod control system through lead 33.

A pressurizer 35 regulates the pressure of the reactor coolant. The typical pressurizer 35 in a PWR includes a heater system which increases coolant pressure by raising the pressure in a head of steam maintained in the pressurizer and a spray system which reduces coolant pressure through condensation of an appropriate proportion of the steam head. Pressurizer pressure is controlled at a setpoint value by a pressurizer control system 37.

A protection system 39 monitors the operation of the nuclear steam supply system, which includes the reactor core 1, the steam generator 7, and their associated and interconnecting components such as the pressurizer 35, by gathering data such as various temperatures, pressures, flow rates, the neutron flux density and certain status indications, through numerous inputs represented by leads 41, 43 and 45. The protection system analyzes the data and generates a trip signal on lead 47 which shuts down the reactor by fully inserting the control rods into the reactor core when selected operating limits are exceeded.

A load signal derived from the steam pressure in the impulse chamber of the turbine 17, and representative of the load imposed on the reactor by the turbine-generator set, is applied to a rapid power change control 49 through lead 51. This control 49, which forms the core of the present invention, generates a temperature reference setpoint signal which is applied to the rod control system 31 through lead 53. Signals representative of certain operating limits used in the present invention, as more fully discussed below, are sent by the protection system 39 to the rapid power change control 49 as represented by lead 55. The pressurizer control system 37 also sends a setpoint signal to and receives an adjusted setpoint signal from the rapid power change control as represented by lead 57.

In addition to rod position control, the temperature of the reactor is also regulated by dissolving controlled amounts of a neutron absorbing material, typically boron, in the reactor coolant. Due to the large amount of reactor coolant, the long loop through which it is circulated and the physical limitations involved in removing boron from the coolant, boron control is used for long term, relatively slow changes in reactor power. The control rods on the other hand, affect reactor power and hence, temperature immediately and hence, are ideal for responding to rapid fluctuations in load. However, continued movement of the control rods results in excessive wear on the rod drive mechanisms and even on the rods themselves as they move relative to guide tubes inside the reactor core.

The solution to the problem of controlling a PWR to follow rapid load changes without excessive wear on the control rod positioning and other system components lies in the fact that a decrease in reactor temperature, while maintaining constant control rod position and boron concentration, results in an increase in reactivity. This is the result of two phenomenon. First, the PWR has a negative doppler coefficient which means that a decrease in fuel temperature produces an increase in the rate of fission reactions within the fuel. Secondly, the reactor coolant, in addition to serving as a heat transfer medium, also serves as moderator for slowing down the neutrons released by the fission reactions to the thermal velocities required for sustained reactions. With a negative temperature moderator coefficient, a reduction in the temperature of the coolant increases its density and therefore its moderator effect so that more neutrons in a given neutron generation produce another fission reaction. Thus, when additional load is placed on the nuclear steam supply system, more thermal energy is extracted from the reactor coolant which lowers its temperature and the fuel temperature. This in turn, results in an increase in reactivity to a level which satisfies the new demand. On the other hand, a reduction in the load causes an increase in reactor temperature which results in a decrease in reactivity. Such an increase in temperature, however, could approach various temperature related operating limits which would cause the protection system to trip the reactor.

The present invention overcomes these limitations by adjusting the temperature reference setpoint signal for the rod control system 31 as a function of the rapid fluctuations in load so that the setpoint signal matches the variations in the actual temperature resulting from the rapid power changes. Thus, the control rods do not move in response to the rapid power changes and the change in reactivity required is accommodated by a change in temperature. This change in temperature affects other systems such as the pressurizer pressure. In order to preclude excessive wear on the pressurizer spray and heater components, the setpoint signal for pressurizer pressure control can also be adjusted as a function of the rapid power changes to match the setpoint to the expected change in pressure resulting from the rapid power changes. Similarly, the setpoint signals for the controllers for other system parameters such as pressurizer water level, boron concentration and gray rod insertion (in some of the newer PWRs) can be adjusted alone or in combination with others to minimize control action in response to rapid power changes.

The present invention also provides for the use of a widened deadband in the response of the rod control system to rapid load fluctuations over the full power range of the reactor. This is accomplished by varying the width of the deadband as a function of the magnitude of the flucuations in load occurring above a predetermined frequency and by reducing the set point for the rod control loop so that the upper temperature edge of the deadband remains within all temperature limits. A wider deadband can also be used in controlling other system parameters either by itself or with adjustment of the associated controller setpoint. The load signal on lead 51 is passed through a low pass filter 59 to eliminate the rapid power changes and is converted to a load derived temperature reference signal in function generator 61 in a conventional manner. In the typical prior art rod control system, this reference signal is used as the setpoint in a conventional rod control loop 63. In the present invention, the rapidly changing component of the turbine load signal on lead 51 is extracted by a conventional high pass filter 65 which may employ a simple rate/lag transfer function or a more complex function as desired. The particular bandpass frequency of the high pass filter 65 depends upon the specific installation and the characteristics of the load pattern to which the plant is subjected, however, typically fluctuations having a frequency of more than one or two cycles per hour would be extracted from the load signal. Typically, but not necessarily, if the transfer function of the high pass filter 65 is $H_2(S)$, the transfer function $H_1(S)$ for the low pass filter 59 is $1-H_2(S)$. The high frequency component of the load signal is applied to a filter 67 having a transfer function:

$$H_3(S) = \frac{T(S)}{Q_{turb}(S)} \qquad \text{(Equation 1)}$$

where $T(S)$ is the laplace transform of the reactor coolant temperature, and $Q_{turb}(S)$ is the laplace transform of the load signal from the turbine. The output of the filter 67 is the expected fluctuation in temperature resulting from the rapid variations in turbine load. This signal is passed through a limiter 69 and is added in summer 71 to the temperature reference signal generated by function generator 61 to produce an adjusted temperature reference signal. The adjusted temperature reference signal is applied to an Auctioneer Low module 73, which as will be seen below, passes the signal along to the rod control loop 63 as $T_{ref}$ as long as it does not exceed permissible temperature limits.

While in theory, the adjusted temperature reference signal should match the variations in reactor coolant temperature induced by the rapid load changes, in practice it is desirable to have a deadband in the response of the rod loop control 63 to assure that the small rapid fluctuations in load do not induce control action. This invention provides a deadband which varies as a function of the magnitude of the rapid power changes. In order to achieve this, the high frequency component of the load signal from filter 65 is also fed to a square law module 75 and then through a unity gain low pass filter 77 which may be a simple first order lag device or a more complex design if desired. The resulting output signal $\sigma^2$ is a measure of the average squared value (i.e. the variance) of the magnitude of the rapidly changing component of the load.

The signal $\sigma^2$, representing the average squared value of the magnitude of the rapid fluctuations in the load signal, is applied to a gain module 79 which generates a temperature related deadband signal as a function of the magnitude of the variance. The deadband output for a given variance is selected to limit the rod stepping frequency to acceptable limits while also providing good control response. A lower limit on the deadband is required for stability, and an upper limit is required to limit temperature variations for reasons such as component fatigue. The intermediate portion may be linear or nonlinear as desired.

Since the plant may experience other large transients, such as load rejection, in addition to those normally occuring as a results of economic load regulation, an active high bistable 81 determines when load changes exceed those expected from load regulation and thus, indicates that other large transients are underway which may require more precise control than the control rods 29 can provide with the wider deadband. Such an output by the active high bistable 81 is memorized by a latch 83 whose active (logic 1) output operates a switch 85 to apply a fixed deadband signal to a lead 87. A logic 0 output from latch 83 operates switch 85 to apply the output of gain module 79 to lead 87. The latch 83 can be reset by an operator manual control. The output of switch 85 which appears on lead 87 is the variable deadband signal which is applied to the rod control loop 63. While the signal $\sigma^2$ can be applied to the bistable 81 as an indication of the magnitude of the fluctuations in load, the output of the square law module 75 may be used instead as illustrated by the dashed line in FIG. 2 and probably is superior for detecting large transients.

In order to prevent the reactor temperature from exceeding the license limit and to maintain adequate margins to trip limits, the varible deadband is substracted in summer 89 from the maximum allowable temperature obtained on lead 91 from an auctioneer low module 93. The auctioneer low module 93 selects the lowest of several temperature limiting signals received from the protection system 39 over leads 55. These signals, which are already available in the protection system, can include: (A) the DNBR (departure from nucleant boiling ratio) limit with an appropriate margin to prevent an unnecessary reactor trip; (B) an exit quality limit which is a measure of the absence of vapor in the reactor coolant leaving the reactor, again with an appropriate margin; (C) the license limit which is the maximum temperature at which the reactor is permitted to operate, and in fact, any other temperature dependent parameter (D) desired, with or without a margin.

The maximum allowable temperature adjusted for the deadband in summer 89 is applied to the auctioneer low module 73 along with the adjusted temperature reference signal derived from the load signal in module 61. The lowest of these two signals is selected by the auctioneer low module 73 as the temperature reference signal, $T_{REF}$, which becomes the setpoint signal for the rod control loop 63. For moderate thermal loads on the reactor, the temperature reference signal derived from the load signal will be lower in magnitude and will be used as the temperature reference. Near full power, is where it can be expected that conditions would arise where the temperature limiting signals adjusted for the deadband would be likely to be selected as the temperature reference signal, $T_{REF}$. With the present invention, however, control of the reactor can be achieved without excessive movement of the control rods right up to full power.

Figure 2:
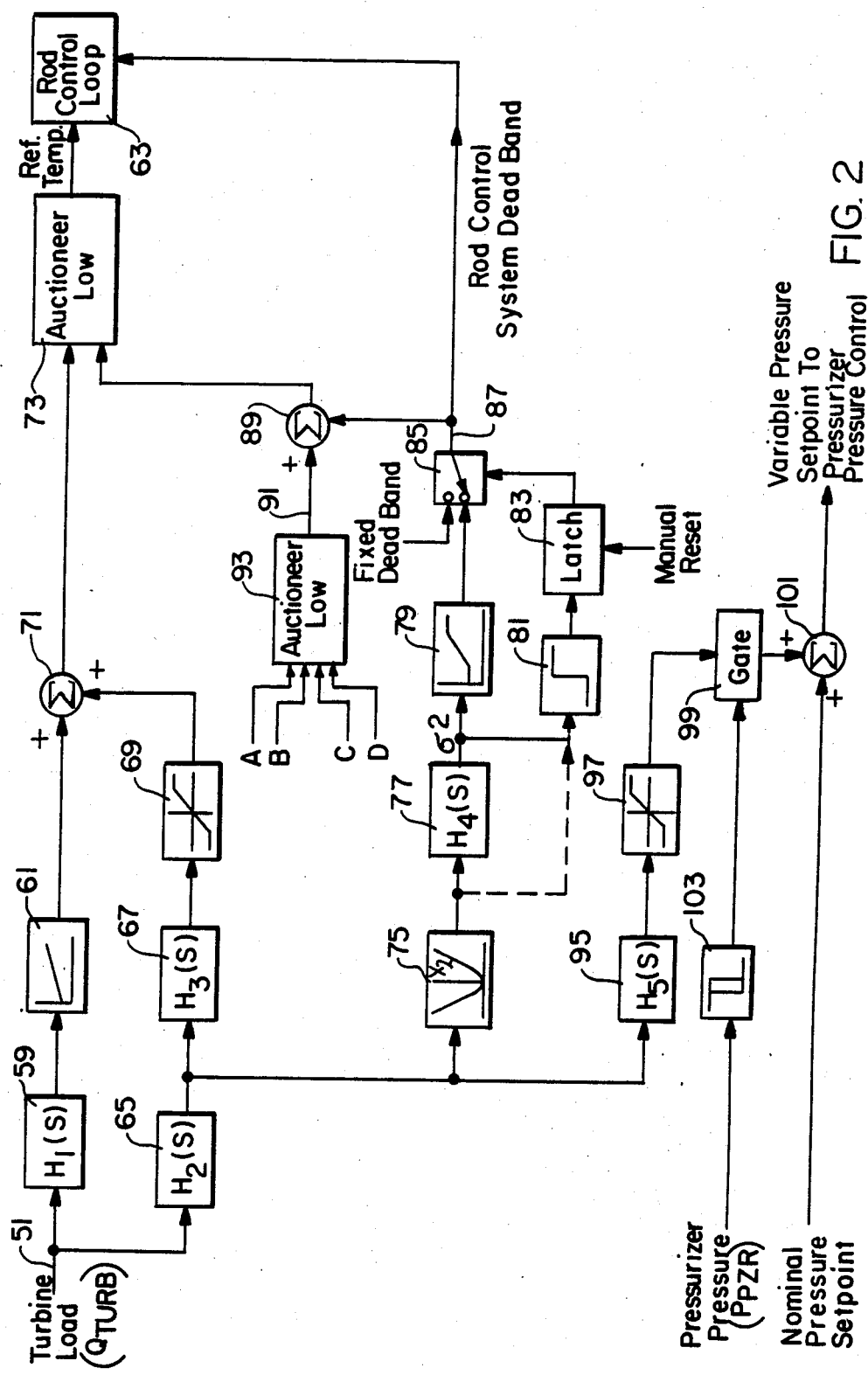
FIG. 2 is a schematic diagram of a control system according to the invention used in the PWR electric power generating system of FIG. 1.

The invention can be applied to other control loops in the PWR in addition to, or in place of, the rod control loop 63. For instance, it may be applied to the pressurizer pressure control loop 59 to minimize operation of the pressurizer spray and heater systems. As shown in FIG. 2, the high frequency component of the load signal, which is extracted in high pass filter 65, is applied to a filter 95 having the following transfer characteristic:

$$H_5(S) = \frac{P_{PZR}(S)}{Q_{TURB}(S)} \quad \text{(Equation 2)}$$

where $P_{PZR}(S)$ is the laplace transform of pressurizer pressure and $Q_{TURB}(S)$ is as explained in connection with equation 1. The output of filter 95 is the variation in the pressurizer pressure setpoint which matches the expected variation in pressurizer pressure resulting from the rapid changes in load. It is limited in magnitude by module 97, passed through gate 99 and added to the standard (fixed) nominal reference pressure setpoint supplied by the pressurizer control system 37 (see FIG. 1) in summer 101. The adjusted pressurizer pressure setpoint is then returned to the pressurizer control system for use in controlling pressurizer pressure. Since it is very desirable to avoid large pressure deviations which may lead to opening pressurizer power operated relief valves, an interlock which includes gate 99 and an active low bistable with hysteresis 103 is included to allow fluctuations in reference pressure only when pressurizer pressure is below a fixed setpoint.

Figure 3:
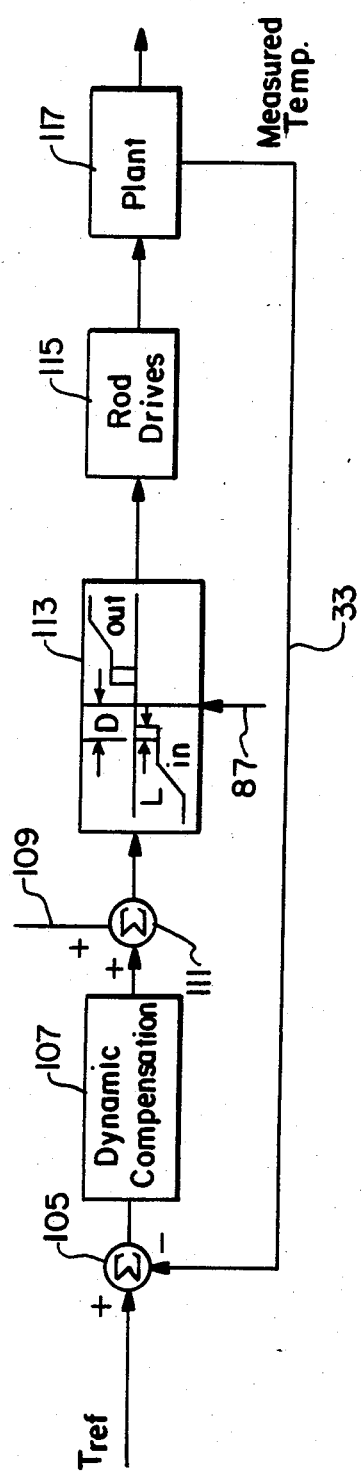
FIG. 3 is a schematic diagram of the rod control loop which forms a part of the rod control system of FIG. 2.

FIG. 3 illustrates schematically the rod control loop 63 to which the temperature reference signal, $T_{REF}$ from the auctioneer low module 73 in FIG. 2 is applied. The measured reactor temperature on lead 33 is subtracted from $T_{ref}$ in summer 105 to generate an error signal. Dynamic compensation is applied to the error signal in a compensation circuit 107. The compensated error signal can be summed with other control signals 109 such as, for instance, a power mismatch signal, in summer 111 and the resultant signal is applied to a known control circuit 113 which generates a drive signal for the control rod drives 115 as a function of the applied signal. The control circuit 113 incorporates mean for generating a deadband, D, in the output response. In other words, no drive signal is generated at the output until the applied signal exceeds the magnitude of the deadband. The width of the deadband is controlled by the magnitude of the deadband control signal applied to the control circuit 113 through lead 87. The lockup, L, may be adjusted as a function of the deadband, D, if desired. Activation of the rod drives 115 causes repositioning of the control rods which are indicated collectively components in the plant 117. Similar control of the deadband can be applied to other control systems in the PWR.

From the above description, it can be appreciated that the present invention is directed to apparatus which automatically adjusts reference setpoints in the control systems of a PWR in response to rapid fluctuations in turbine load. The system works for all ranges of automatic reactor control up to 100% power. The modules 67 and 95 may use time varying transfer functions to account for normal changes in plant response with core life. Suitable transfer functions can be obtained through well-known system identification techniques, such as those given in Franklin and Powell, "Digital Control of Dynamic Systems", Chapter 8, Addison-Wesley Publishing Co., copyright 1980, second printing June, 1981. The system can be implemented by conventional continuous circuitry or by digital technology.

It can also be appreciated that the invention provides for a variable deadband in the response of the rod control system to rapid fluctuations in load on a PWR and that the width of the deadband is a function of the variance of the magnitude of the fluctuations above a predetermined frequency. It can be further appreciated, that the invention permits variable deadband rod control to be used up to full power by limiting the temperature reference signal in the rod control loop such that the high temperature edge of the deadband response is within all reactor temperature limits. The result is reduced wear on rod control components while maintaining full capability to load follow. In an alternate embodiment of the invention, the output of filter 67 or limiter 69 can be used as the input to square law module 75 rather than the output of the high pass filter 65, thus basing the variable deadband width on the anticipated changes in temperature. The setpoints for modules 77, 79, 81 and 83 would have to be changed accordingly.

While specific embodiments of the invention have been described in detail, it will be appreciated by those skilled in the art that various modifications and alternatives to those details could be developed in light of the overall teachings of the disclosure. For instance, while the invention has been described as being implemented by hard wired circuitry, many of the functions can be performed by appropriate software in a programmed digital computer. Accordingly, the particular arrangements disclosed are meant to be illustrative only and not limiting as to the scope of the invention which is to be given the full breadth of the appended claims and any and all equivalents thereof.

What is claimed is:

1. Apparatus for controlling the response to a load signal of a pressurized water reactor having a plurality of controlled process variables, said apparatus comprising:
    a control system for effecting control actions to regulate a selected process variable to a value called for by a setpoint reference signal; and
    means responsive only to rapid fluctuations in said load signal above a predetermined frequency for adjusting the value of said setpoint reference signal by an amount which substantially matches the variation in the value of the selected process variable expected as a result of said rapid fluctuations in the load signal without control action, and taking into account any time delay in the affect of the rapid fluctuations on the selected process variable, whereby control actions effected by said control system are substantially reduced.

2. The apparatus of claim 1 wherein said setpoint reference signal adjusting means includes means for limiting the amount by which said setpoint signal is adjusted to a predetermined value whereby control actions are effected by said control system in response to rapid fluctuations in said load signal which are of large magnitude.

3. The apparatus of claim 2 wherein said pressurized water reactor supplies steam to a turbine-generator set having an impulse chamber, wherein said apparatus includes means for generating said load signal as a function of the steam pressure in said impulse chamber and wherein the setpoint reference signal adjusting means adjusts the amount by which the setpoint signal is adjusted as a function of time taking into account the lag in time in the response of the selected variable to a change in impulse chamber steam pressure.

4. The apparatus of claim 1 wherein said pressurized water reactor includes control rods, wherein said control system positions the control rods to regulate the reactor power level in response to a temperature reference setpoint signal and includes means for generating said temperature reference setpoint signal as a function of said load signal, and wherein said setpoint signal adjusting means adjusts said temperature reference setpoint signal by an amount which results in a change in reactor power level through a change in reactor temperature rather through repositioning of the control rods.

5. The apparatus of claim 4 wherein said rod control system includes means for generating a deadband in the response of the control rods to said temperature reference setpoint signal by inhibiting repositioning of the control rods in response to changes in the temperature reference setpoint signal below a predetermined magnitude.

6. The apparatus of claim 5 wherein said deadband generating means comprises means for varying the width of said deadband as a function of the magnitude of the changes in the temperature reference setpoint signal above said predetermined frequency.

7. The apparatus of claim 1 wherein said pressurized water reactor includes a primary coolant loop and a pressurizer for maintaining a programmed pressure in the primary coolant loop, and wherein said control system includes means responsive to a pressure reference setpoint signal for regulating pressurizer pressure and said adjusting means is responsive to fluctuations in said load signal above said predetermined frequency to adjust the pressure reference setpoint signal by an amount which corresponds to the expected variation in pressurizer pressure as a result of the rapid fluctuations in the load signal.

8. The apparatus of claim 7 wherein said adjusting means includes means for adjustment of the pressure reference setpoint signal in response to rapid fluctuations in the load signal when the pressurizer pressure is above a predetermined magnitude.

9. The apparatus of claim 8 wherein said adjusting means includes means for limiting the amount by which the pressure setpoint signal is adjusted to a predetermined value.

10. A method of operating a pressurized water reactor having a plurality of control systems controlling a plurality of process variables, said method comprising the steps of:
generating setpoint signals for said control systems;
operating said control system to effect control actions which regulate the associated process variables to the value called for by the associated setpoint signal;
generating a load signal representative of the load imposed on the reactor;
generating from said load signal a rapid fluctuation signal representative of the magnitude of fluctuations in the load signal above a predetermined frequency; and
adjusting the magnitude of at least one of said setpoint signals in response to said rapid fluctuation signal by an amount which substantially matches the change in the value of the associated process variable expected as a result of said rapid fluctuations in the load signal without control action, taking into account any time delay in the affect of the load change on the value of the associated process variable, whereby the control actions required by the associated control system are significantly reduced.

11. The method of claim 10 wherein said adjusting step comprises the steps of:
generating a transfer function representative of the change required in at least one setpoint signal to effect a change in the value of the associated process variable which substantially matches the expected change in the process variable resulting from the changes in load above said predetermined frequency;
applying said transfer function to said rapid fluctuation signal to generate an adjustment signal; and
summing said adjustment signal with said at least one setpoint signal.

12. The method of claim 11 including the step of limiting the magnitude of the correction signal to a preselected value.

13. The method of claim 12 including the steps of measuring the selected process variable and applying said correction signal to the setpoint signal only when said selected process variable is below a preselected value.

14. The method of claim 12 including the steps of operating said control system so that control action is only effected when the change in magnitude of the setpoint signal exceeds a preset value so that there is a deadband in the response of the control system.

15. The method of claim 14 including the step of adjusting the width of said deadband as a function of the magnitude of the fluctuations in said load signal above said predetermined frequency.

16. The method of claim 15 wherein said pressurized water reactor includes a reactor coolant loop, wherein said selected process variable is coolant temperature, wherein said control system effects changes in coolant temperature by repositioning control rods in the reactor and wherein said setpoint signal is a temperature reference signal generated as a function of said load signal.

17. The method of claim 13 wherein said pressurized water reactor includes a reactor coolant loop and a pressurizer controlled by said at least one control system to regulate the pressure in the reactor coolant loop, and wherein the setpoint signal represents a programmed value for the pressurizer pressure.

18. Apparatus for controlling the response of a pressurized water nuclear reactor, having control rods for controlling the reactor power level, to rapid fluctuations in a load signal representative of the load imposed on the reactor, said apparatus comprising:
rod control means responsive to the load signal for positioning the control rods to regulate the power level of the reactor to the power level called for by the load signal, and including means for generating a deadband in the response of the control rods to changes in the magnitude of the load control signal by inhibiting repositioning of the control rods when the change in magnitude of the load signal is smaller than a selected change in magnitude such that the reactor adjusts to such small changes in load imposed thereon through changes in operating temperature; and
deadband adjusting means for varying the value of said selected change in magnitude of the load signal defining said deadband as a function of the magnitude of fluctuations in the load signal above a predetermined frequency, whereby the width of the deadband in the rod control means is varied with the magnitude of the rapid power changes resulting in a significant reduction in the control actions required by the rod control means.

19. The apparatus of claim 18 wherein said means for varying the value of said selected change in magnitude of the load signal defining the deadband includes means for increasing the value of the selected change as the magnitude of the fluctuations in the load signal above the predetermined frequency increases.

20. The apparatus of claim 19 including means for generating a temperature reference signal ($T_{REF}$) from said load signal and wherein said rod control means positions the control rods in response to said temperature reference signal, said apparatus also including protection means for generating temperature limits for operation of the reactor and limit means responsive to the deadband adjusting means and the protection means for maintaining the temperature reference signal ($T_{REF}$) at a value which prevents the reactor operating temperature from exceeding said temperature limits despite the variations in the width of said deadband.

21. Apparatus for controlling the response to a load signal of a pressurized water nuclear reactor having control rods for regulating the power level of the reactor said apparatus comprising:
deadband signal generating means responsive to said load signal for generating a deadband control signal as a function of the magnitude of fluctuations in the load signal above a predetermined frequency;
reference means for generating a temperature reference signal from said load signal; and
rod control means response to the magnitude of the temperature reference signal ($T_{REF}$) for positioning said control rods and including deadband control means responsive to said deadband control signal for inhibiting the response of the control rods to the temperature reference signal ($T_{REF}$) when the difference between actual temperature and the temperature called for by the temperature reference signal is less than said deadband control signal, whereby the deadband in the response of the control rods to changes in the load signal varies as a function of the magnitude of rapid load changes resulting in a significant reduction in the control actions required by the rod control means.

22. The apparatus of claim 21 including protection means responsive to the operating conditions of the reactor for generating a temperature limit signal representative of the maximum operating temperature of the reactor for existing conditions and limit means for generating a maximum temperature reference signal by substracting the deadband control signal from the temperature limit signal and wherein said reference means includes means responsive to said load signal for generating a load temperature reference signal and means for selecting the smaller of said load temperature reference signal and the maximum temperature reference signal as said temperature reference signal.

23. The apparatus of claim 22 wherein said deadband signal generating means includes high pass filter means for extracting from the load signal a signal representative of the magnitude of fluctuations in the load signal above said predetermined frequency, means for generating a signal representative of the average squared value of said extracted signal and means for generating therefrom a temperature related deadband control signal which varies in magnitude in terms of degrees of operating temperature as a function of the magnitude in said fluctuations in said load signal.

24. The apparatus of claim 23 including means for generating a deadband control signal of fixed magnitude, and selection means responsive to the magnitude of the fluctuation of said load signal above a preset level for selecting said signal of fixed magnitude for said deadband control signal in place of said variable deadband control signal.

25. The apparatus of claim 24 wherein said selection means includes switch means response to said average squared value signal for selecting said signal of fixed magnitude as said deadband control signal when said average squared value signal exceeds a preset level.

26. A method of operating a pressurized water nuclear reactor having control rods for regulating reactor power in response to a load signal representative of the load imposed on the reactor including the steps of:
positioning the control rods as a function of the change in magnitude of the load signal when the magnitude of such change exceeds a selected value, such than there is a deadband in the response of the control rods to changes in magnitude of the load signal which causes the reactor to respond to changes in magnitude smaller than the selected value through a change in reactor operating temperature; and
varying said selected value as a function of the magnitude of fluctuations in the magnitude of the load signal above a predetermined frequency whereby positioning of the control rods is substantially reduced.

27. The method of claim 26 wherein the step of positioning the control rods comprises the steps of: generating a temperature reference signal from the load signal, measuring the reactor temperature, comparing the temperature reference signal to the measured signal and positioning the control rods as a function of the difference therebetween when said difference exceeds said selected value.

28. The method of claim 27 wherein the step of varying the selected value of said difference between the temperature reference signal and the measured temperature signal which defines said deadband comprises: extracting the fluctuations in the load signal above said predetermined frequency from said load signal, generating a signal representative of an average squared value of the magnitude of said fluctuations and varying the selected value defining said deadband as a temperature function of said average squared value signal.

29. The method of claim 28 including monitoring the operation of the reactor and generating a signal representative of a limiting value for the reactor temperature as a function of existing conditions, and wherein the step of generating said temperature reference signal includes limiting the magnitude thereof to a value which will maintain the reactor temperature below said reactor temperature limit taking into account the width of said deadband as represented by said selected value of the difference between the temperature reference signal and the reactor measured temperature.

30. The method of claim 29 wherein the step of generating the temperature reference signal includes generating a load derived temperature reference signal from the load signal and wherein said step of limiting the temperature reference signal includes the steps of: subtracting the temperature function of the average squared value signal from the reactor temperature limit signal to generate a maximum temperature reference signal and selecting the smaller of the load derived temperature reference signal and the maximum temperature reference signal as the temperature reference signal.

31. The method of claim 30 including the step of monitoring the magnitude of the average squared value signal and substituting a deadband signal of fixed magnitude for said temperature function of the average squared value signal as the selected value defining said deadband when the magnitude of the average squared value signal exceeds a prechosen level.

* * * * *